Jan. 14, 1958 J. F. WOERNER 2,819,636
INSIDE PIPE WRENCHES

Filed March 10, 1955 7 Sheets-Sheet 1

Joseph F. Woerner
INVENTOR.

BY
Charles E. Lightfoot
ATTORNEY

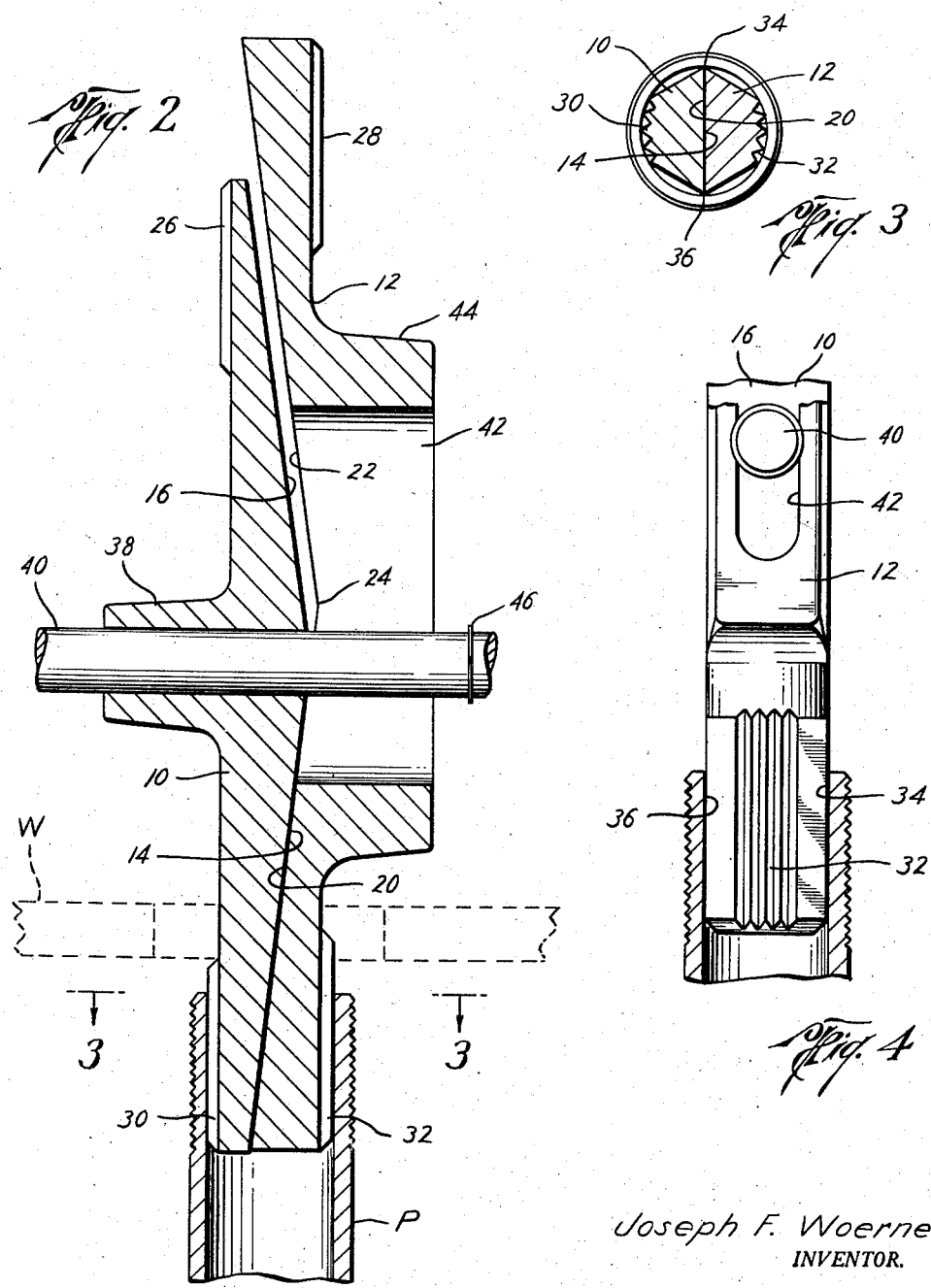

Jan. 14, 1958
J. F. WOERNER
2,819,636
INSIDE PIPE WRENCHES
Filed March 10, 1955
7 Sheets-Sheet 3
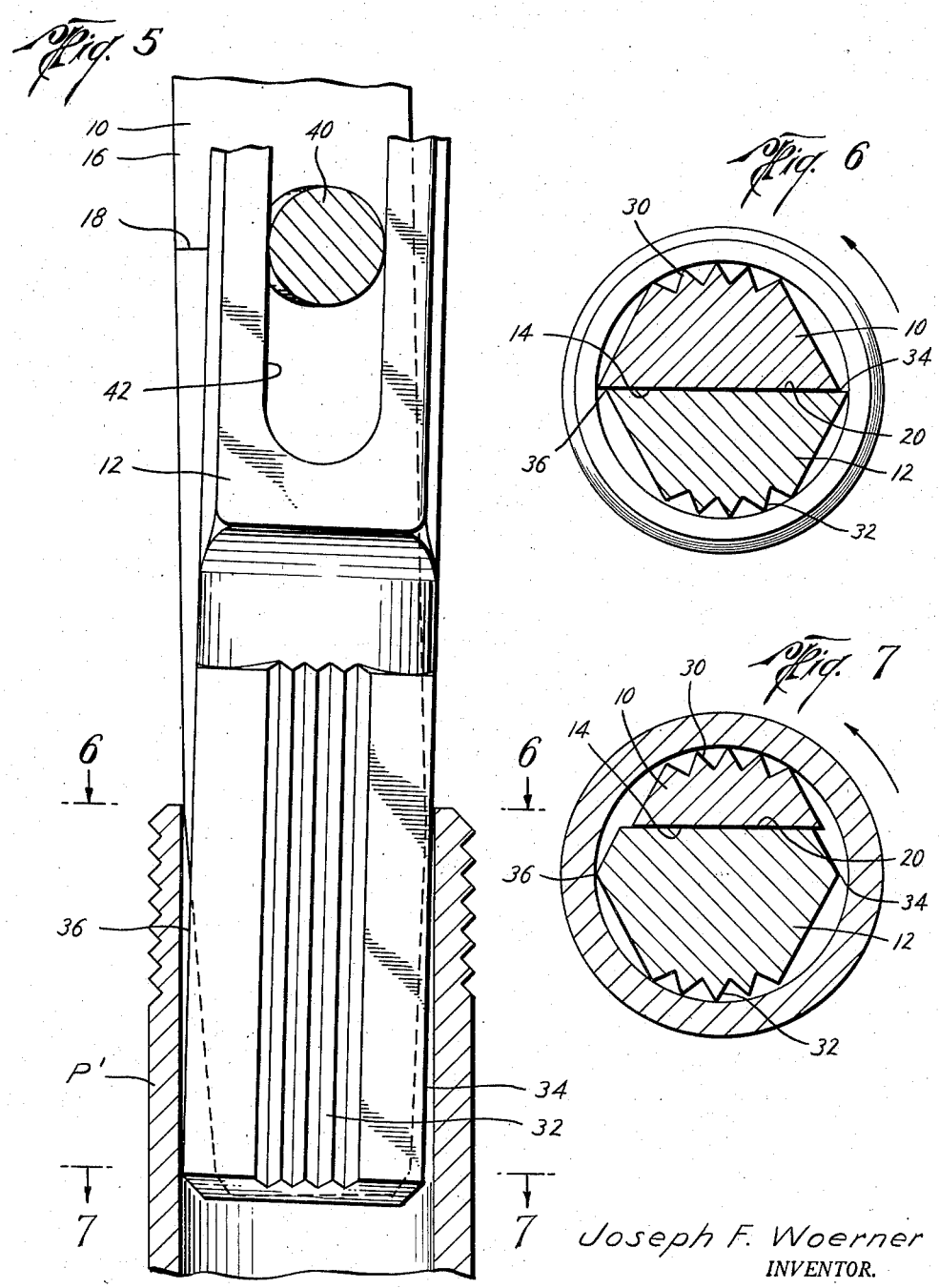
Joseph F. Woerner
INVENTOR.
BY Charles E. Lightfoot
ATTORNEY

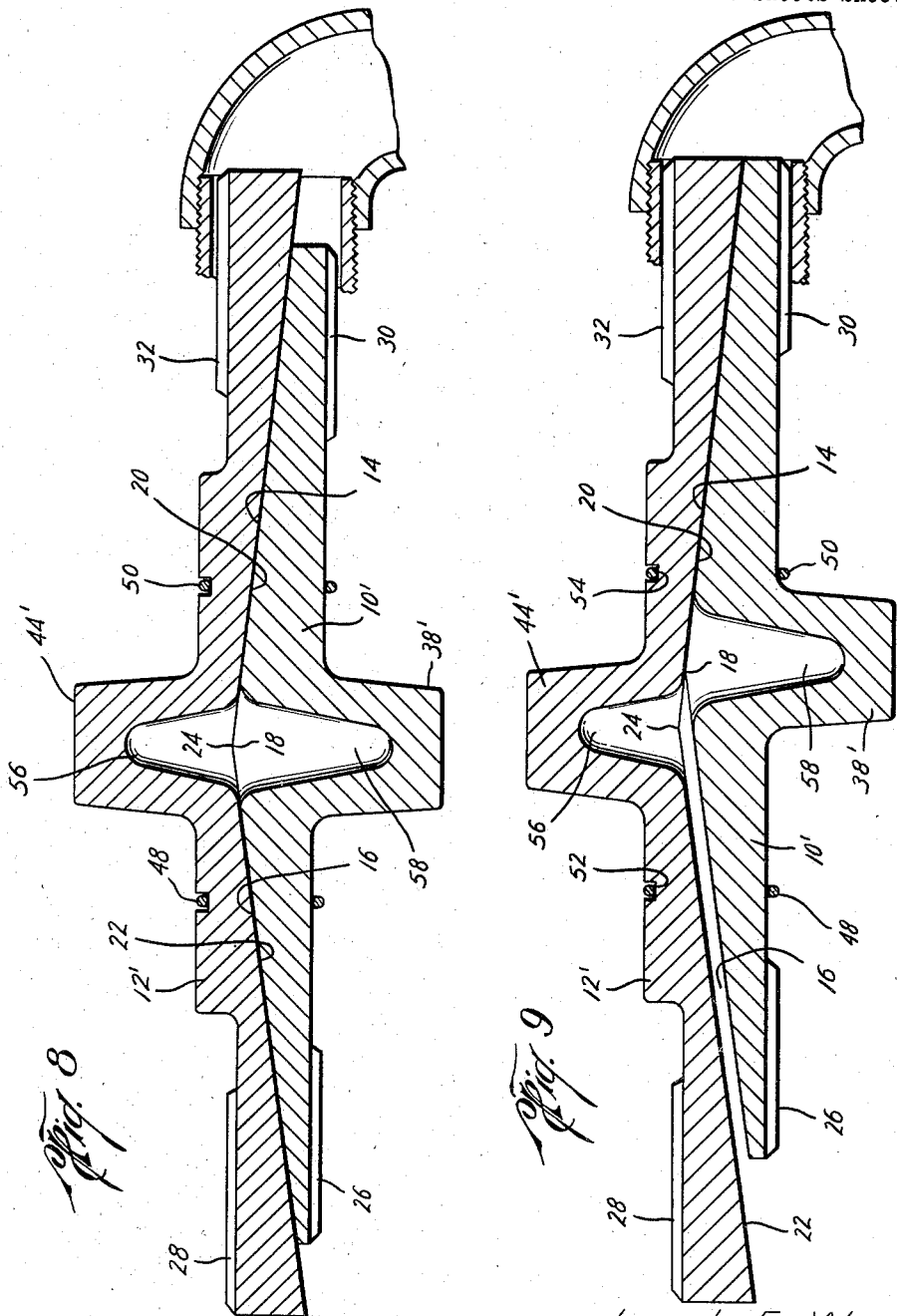

Jan. 14, 1958     J. F. WOERNER     2,819,636
INSIDE PIPE WRENCHES
Filed March 10, 1955     7 Sheets-Sheet 5
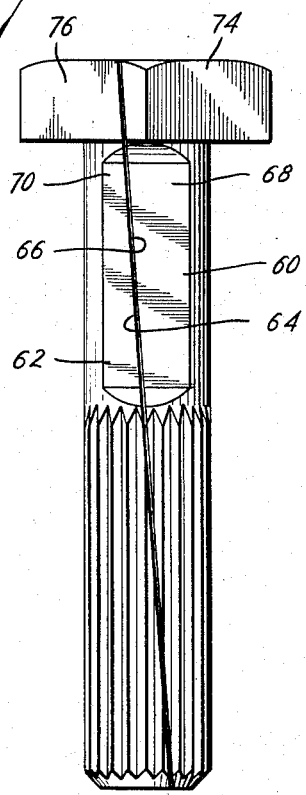
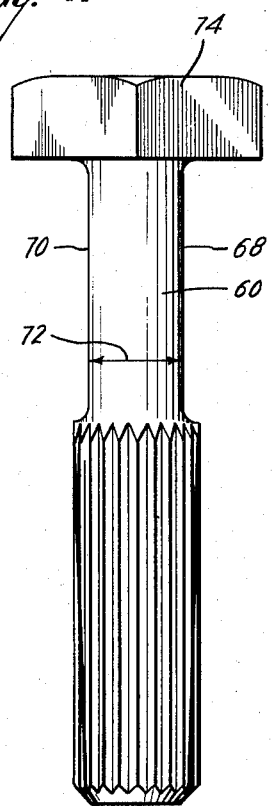
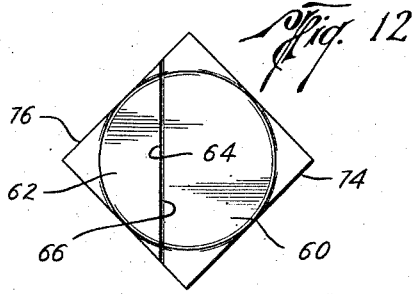
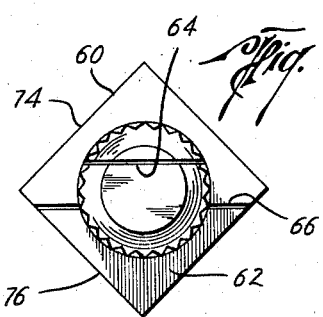
Joseph F. Woerner
INVENTOR.
BY Charles E. Lightfoot
ATTORNEY Jan. 14, 1958 J. F. WOERNER 2,819,636
INSIDE PIPE WRENCHES
Filed March 10, 1955 7 Sheets-Sheet 6
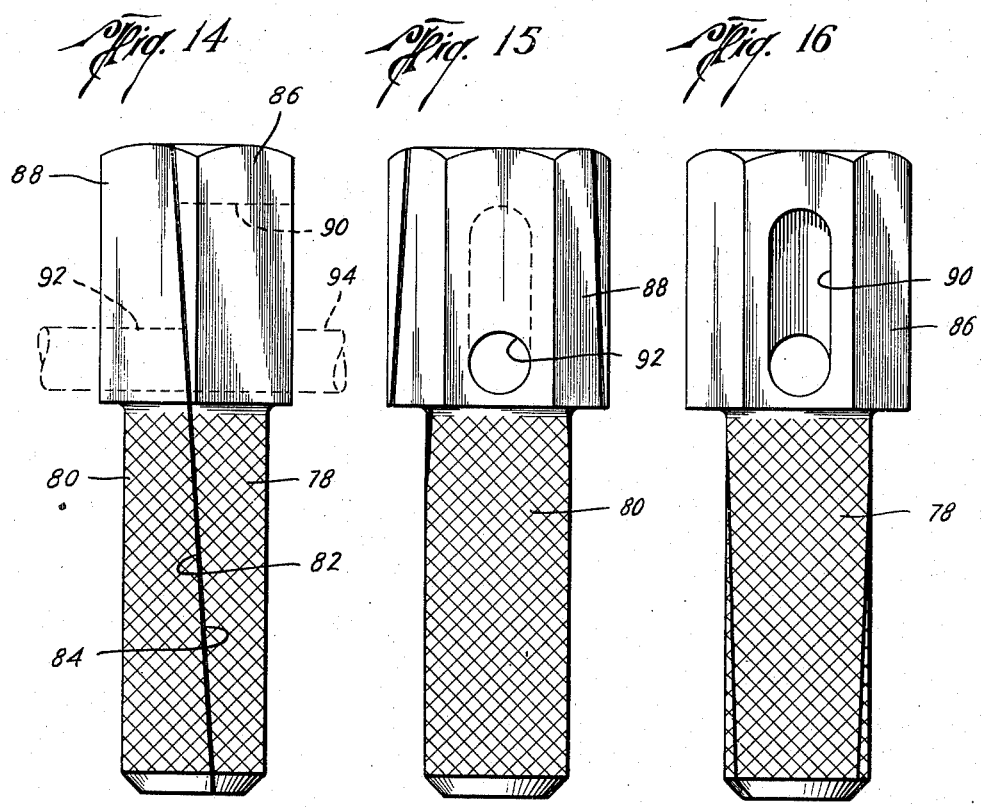
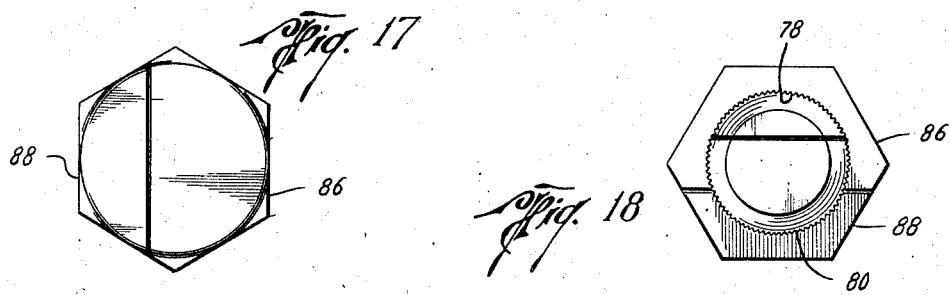
Joseph F. Woerner
INVENTOR.
BY
Charles E. Lightfoot
ATTORNEY Jan. 14, 1958 J. F. WOERNER 2,819,636
INSIDE PIPE WRENCHES
Filed March 10, 1955 7 Sheets-Sheet 7
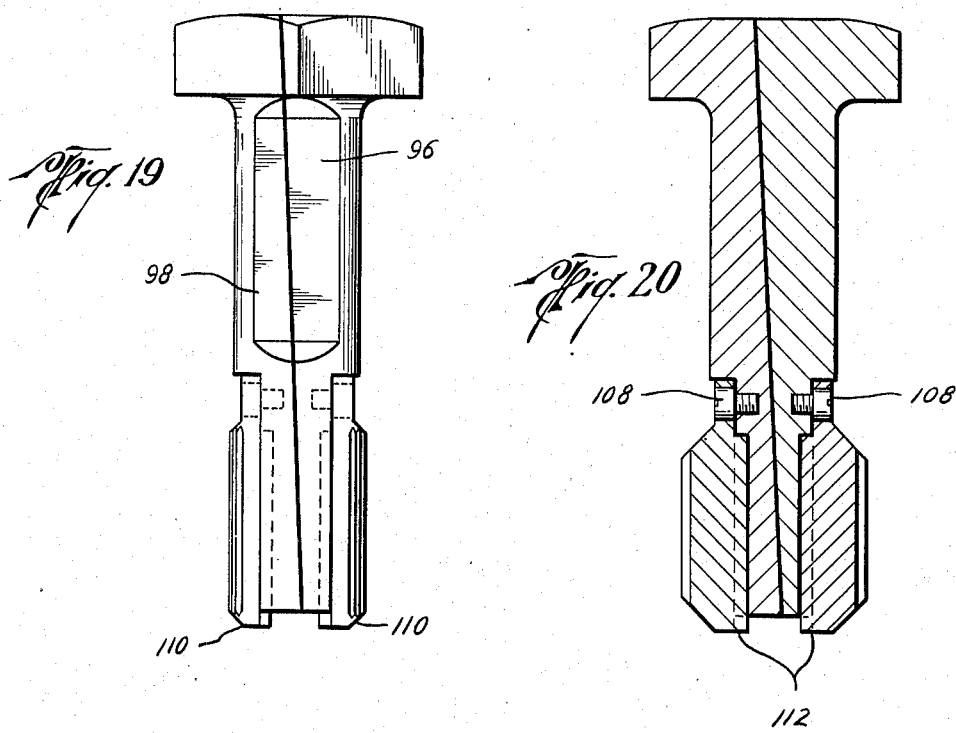
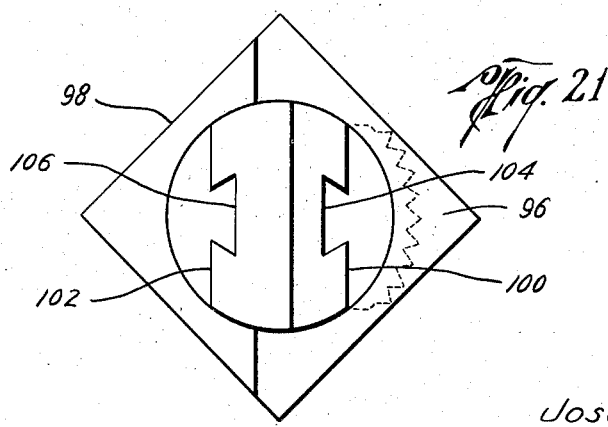
Joseph F. Woerner
INVENTOR.
BY
Charles E. Lightfoot
ATTORNEY

United States Patent Office 2,819,636
Patented Jan. 14, 1958

2,819,636

INSIDE PIPE WRENCHES

Joseph F. Woerner, Houston, Tex.

Application March 10, 1955, Serial No. 493,400

4 Claims. (Cl. 81—72)

This invention relates generally to inside pipe wrenches and more specifically to a new and improved type of said wrench.

Inside pipe wrenches are adapted to contact the inner walls of pipes in order to rotate said pipes for threading operations. The use of an inside wrench is necessary for many applications in the plumbing industry; such as threading plated pipes to prevent marring their finish, gripping pipes whose ends are flush with or within the surface of a wall, turning full threaded nipples, removing the broken female end of a pipe from within a male connection, etc. The invention disclosed herein is well adapted to these and other uses as is clearly set forth in the objects following:

An object of this invention is to provide an inside pipe wrench adapted to expand to gripping engagement within the inner diameter of a pipe whereby the application of a torque force will be transmitted to the pipe, through said gripping engagement.

Another object is to provide an inside pipe wrench of two major components.

A further object is to provide a wrench of the character described that may be set to gripping engagement or to a released position through relative movement of the wrench components.

A further object is to provide an inside pipe wrench that may be set and released quickly and simply.

A further object is to provide an inside pipe wrench that may be set to gripping engagement with finger pressure.

A further object is to provide a durable and sturdy inside pipe wrench.

A further object is to provide an inexpensively manufactured inside pipe wrench.

A further object is to provide in a form of this invention an inside pipe wrench adapted to fit both standard and extra heavy pipe of the same size.

A further object is to provide in a form of this invention an inside pipe wrench adapted to fit its respective ends within each of two different sized pipes.

A further object is to provide in a form of this invention an inside pipe wrench adapted to fit its respective ends within each of two different sized pipes and within both standard and extra heavy types of the two pipe sizes.

A further object is to provide in a form of this invention a pin integral with the wrench components to serve both as a torque transmitting means and a means of holding said wrench components together.

A further object is to provide in this invention means for torque application of the wrench.

A further object is to provide in this invention means for holding the components of the wrench together.

A further object is to provide in a form of this invention interchangeable sets of gripping members adapted to fit different sized pipes and to be secured to the two component parts of an inside pipe wrench.

A further object is to provide an inside pipe wrench adapted for use as a pulling tool.

Other objects and advantages of the invention will appear from the following description thereof, reference being had to the accompanying drawings wherein—

Fig. 2 is a longitudinal sectional view of the wrench shown in Fig. 1.

Fig. 3 is a cross sectional view taken on the line 3—3 of Fig. 2.

Fig. 4 is a fragmentary view partly in elevation of the wrench set within a section of extra strong pipe.

Fig. 5 is an enlarged fragmentary view partly in elevation of the wrench set and under torque within a section of standard pipe.

Fig. 6 is a cross sectional view taken on the line 6—6 of Fig. 5.

Fig. 7 is a cross sectional view taken on the line 7—7 of Fig. 5.

Fig. 8 is a longitudinal sectional view of a modified form of the invention illustrating the component parts in a released position.

Fig. 9 is a view similar to Fig. 8 but illustrating the parts in a set position.

Fig. 10 is a front elevational view of an additional form of the invention.

Fig. 11 is a side elevational view of the tool shown in Fig. 10.

Fig. 12 is a top plan view of the tool shown in Fig. 10.

Fig. 13 is a bottom plan view of the tool as shown in Fig. 11.

Fig. 14 is a front elevational view of still another form of the invention.

Fig. 15 is a left side elevational view of the tool shown in Fig. 14.

Fig. 16 is a right side elevational view of the tool shown in Fig. 14.

Fig. 17 is a top plan view of the tool shown in Fig. 14.

Fig. 18 is a bottom plan view of the tool as shown in Fig. 16.

Fig. 19 is a front elevational view of a modified form of the invention incorporating removable gripping members.

Fig. 20 is a longitudinal sectional view of the wrench shown in Fig. 19 but illustrated with a larger pair of gripping members secured to the components of the tool.

Fig. 21 is an enlarged bottom plan view of the tool shown in Fig. 19 with the gripping members removed.

Figure 1:
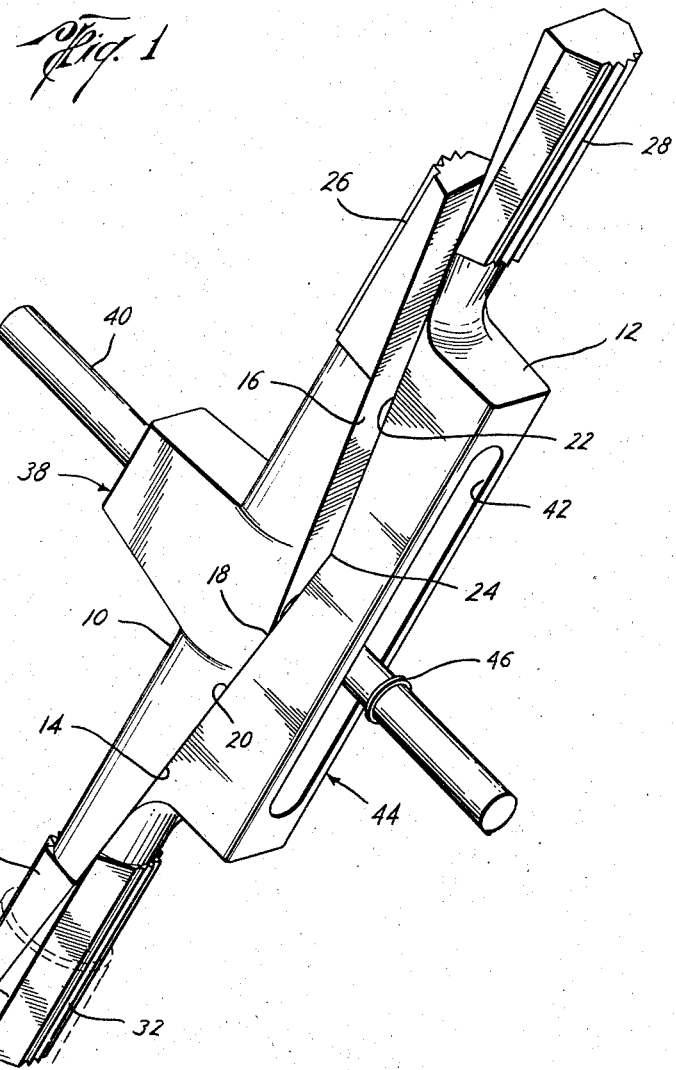
Fig. 1 is an isometric view (shown with one end in set position) of a form of the invention in which the respective ends of the tool are adapted to fit each of two different sized pipes.

The inside pipe wrenches illustrated in Figs. 1 through 7 comprise two basic component parts, a male member 10 and a female member 12. The male member 10 has two flat faces 14 and 16 formed in angular relationship to each other and to the axis of the member and intersecting in a line 18 located midway of the member 10 and forming an exterior angle thereat. The female member 12 has two flat faces 20 and 22 formed in angular relationship to each other and to the axis of member 12 and intersecting in a line 24 located midway of the member and forming an interior angle thereat, the sum of said interior and exterior angles being substantially 360 degrees.

As clearly shown in Fig. 8 the two faces 14 and 20 will lie in the same plane and the two faces 16 and 22 will lie in their respective plane when the intersecting lines 18 and 24 are common. Relative lateral movement of the male member 10 with the female member 12 will cause the member 10 to ride up that one of the faces of the member 12 toward which such lateral movement is directed and thus expand the cross sectional area through any perpendicular plane along the length of said movement.

As shown in Fig. 1 face 14 has been directed along face 20 and the expanded cross sectional area at the end of said faces has contacted the inside wall of a section of pipe P shown in broken lines.

Formed at the end of each member are laterally disposed, externally protruding teeth or gripping means to engage the inside wall of a pipe. The gripping ends 26 and 28 are designed to expand within one sized pipe, for example a ¾" pipe. The gripping ends 30 and 32 are designed to expand within another sized pipe, for example a 1" pipe.

Pipes are commonly made in two types for each size, standard and extra strong. The wall thickness of these types vary while the size or outside diameter remains constant, thus the inside diameter of extra strong pipe is less than the inside diameter of standard pipe of the same size.

As shown in Figs. 2–4 the face 14 of member 10 has advanced along the face 20 of the member 12 to expand the teeth 30 and 32 into gripping engagement with the inside of a pipe P whose end is located within a wall section W, shown in dotted lines. If pipe P is of the extra strong type for its particular size the edges 34 and 36 of the member 12 will also contact the pipe wall along their entire length and provide additional gripping stability.

As shown in Figs. 1 through 4 the male member 10 has an extrusion 38 extending outwardly. This extrusion provides a housing for the torque pin 40 and a shoulder against which a force may be applied to cause relative lateral movement of member 10 with member 12 in either direction for setting the wrench. Torque pin 40 extends through a slot 42 formed in the extruded shoulder 44 of female member 12. Pin 40 provides a means of imparting torque to the tool and has in addition a snap ring 46 to prevent the two members 10 and 12 from becoming separated.

Referring now to Fig. 5 through 7 the wrench is shown expanded under torque within a pipe P' which may be a "standard" type of the same size as the pipe P of Figs. 2 through 4. The edges 34 and 36 of member 12 will not be in contact with this larger inside diameter pipe (when the teeth 30 and 32 have expanded into gripping engagement), until the tool is put under torque by pin 40. At this time the two members will cock about each other within the pipe and cause the lower corner of edge 36 and the upper portion of edge 34 to bite into the inner wall of pipe P' as is clearly shown in the sectional views, Figs. 6 and 7. As greater torque is applied, the gripping action of this cocked position will become tighter; for each member has become a first class lever bar in this side bite. Torque applied in the opposite direction will reverse those portions of the edges 34 and 36 that bite into the pipe but will exert equal gripping properties.

When it is required to loosen the wrench, face 14 of male member 10 must be forced along face 20 of female member 12 until intersecting lines 18 and 24 are common as shown in Fig. 8. It will be noted in Fig. 8 that the ends of member 10 fall short of the ends of member 12 when the tool is in a released position. When the tool is in a set position one end of member 10 is substantially flush with a corresponding end of member 12 as a protrusion of the member 10 beyond the end of the member 12 might interfere with the setting within an elbow.

Figs. 8 and 9 illustrate a modified form of the wrench in which the extruded portions 38' and 44' are provided solely for the provisions of a shoulder against which a force or tapping action may be used to set or free the wrench within a pipe. Torque may be applied to this wrench by means of any well known external pipe wrench. The two major components 10' and 12' of this modified form are also held against separation by snap rings 48 and 50 which fit into grooves 52 and 54 respectively. The snap ring grooves 52 and 54 are only cut into the female member 12' thus permitting the ring to slide along the surface of member 10' when the tool is expanded and contracted. Snap rings of spring steel are commonly split at one point and so will expand and contract with the tool. The instrusions 56 and 58 are made upon dispersing the metal of extrusions 38' and 44' outwardly when the parts are forged.

Referring now to Figs. 10–13 a single ended inside pipe wrench is illustrated. A wedge member 60 and a wedge member 62 are shown adjacent each other with their respective inclined planes 64 and 66 in the same angular plane. When wedge 60 is advanced inwardly in respect to wedge 62 the cross sectional area of the wrench end is increased; conversely when wedge 60 is advanced outwardly in respect to wedge 12 the cross sectional area of the wrench end is decreased. Each wedge member is provided with teeth at its lower end that are adapted to grip the inside diameter of a pipe. The crown of the teeth being the same outside diameter as the inside diameter of the particular pipe size for which the tool is made when the tool is expanded to the position illustrated. Each wedge member is provided with milled wrench flats as at 68 and 70. These flats are milled at right angles to the plane of the wedges and hence the expansion of the wrench does not change the distance 72 across the flats. The distance 72 would correspond to a standard size open end wrench. The flats provide a means of rotating the tool.

Each wedge member is enlarged at the upper end with heads 74 and 76 that form, in the expanded position of the tool, a square headed top of a standard bolt top size for an alternate means of torque application. The heads also provide means of setting and releasing the tool. When head 76 on wedge 62 is tapped inwardly the tool releases. The heads also prevent the parts from being dropped into a vertical pipe and lost.

Referring now to Figs. 14–18 another modification of the inside pipe wrench is illustrated. Two wedge members 78 and 80 have inclined planes 82 and 84 adjacent each other. The lower portion of each wedge section is knurled and the outside diameter of this knurl is equal to or slightly less than the inside diameter of a particular sized pipe when the tool is in an expanded position as shown. The upper portion of each wedge member is provided with a head as at 86 and 88. The two heads match to form a hexagonal body of a standard hex bolt size when the tool is in an expanded position and provide means for torque application. The heads 86 and 88 are also used in setting and releasing the tool. Head 86 is formed with a slot 90 and head 88 with a hole 92. The hole 92 and the slot 90 are adapted to receive a pin 94 shown in dotted lines. The pin 94 may be used as a means of rotating the tool. The two members may be magnetized with opposite end polarity and thus held together.

The knurled gripping means shown in this tool makes it adaptable for use as a pulling tool as well as an inside pipe wrench. If the tool is set within a bored shaft, a bearing, or other object to be pulled; and outward pull on wedge 80 will expand the tool in the same manner as would an inward thrust on wedge 78. If the outward pull is sufficient to remove the object to be pulled, the expansion of the tool will set the knurled teeth in an ever tightening grip and the object will move with the outward pull.

Referring now to Figs. 19–21 a further modification of the inside pipe wrench is illustrated. Two wedges 96 and 98, similar to wedges 60 and 62 of Figs. 10–13, are each provided at their lower ends with milled flats 100 and 102 respectively. The milled flat 100 has a dove-tailed recess 104 in the lower portion of its length and the milled flat 102 has a similar recess 106 in the lower portion of its length. Each recess is adapted to receive a gripping dog as shown in Figs. 19–20. The gripping dogs are held in place with set screws 108. The gripping dogs may be of various sizes. The dogs 110 of Fig. 19 being smaller, as shown, than the dogs 112 of Fig. 20. Each sized set of gripping dogs may be made so that the crown of their gripping teeth will lie in same diameter as the inside of a particular pipe size. The two major components 96 and 98 will accommodate a number of different sized gripping dogs and the whole will constitute a set of inside pipe wrenches.

While a number of preferred embodiments of the invention have been shown and described, many modifications thereof can be made by one skilled in the art and without departing from the spirit of the invention, and it is desired to cover by Letters Patent all forms of the invention falling within the scope of the following claims.

I claim:

1. An inside pipe wrench comprising two body members shaped to be assembled in longitudinally movable sliding relation for insertion in a pipe, each of said members having surface portions which are inclined in opposite directions longitudinally of the member and positioned for sliding engagement with corresponding surface portions of the other member to impart relative lateral movement to the members to expand the body into gripping engagement with the interior of the pipe upon relative longitudinal movement of the members in assembled relation.

2. An inside pipe wrench comprising two body members shaped to be assembled in longitudinally movable sliding relation for insertion in a pipe, each of said members having surface portions which are inclined in opposite directions longitudinally of the member, said surface portions of one of the members being positioned to form an exterior angle and said surface portions of the other of the members being positioned to form an interior angle which is equal to said exterior angle and to slidably engage the corresponding surface portions of said one of said members to impart relative lateral movement to the members to expand the body into gripping engagement with the interior of the pipe upon relative longitudinal movement of the members in one direction.

3. An inside pipe wrench comprising two elongated body members shaped to be assembled in longitudinally movable sliding relation for insertion in a pipe, each of said members having surface portions which are inclined in opposite directions longitudinally of the member and positioned for sliding engagement with corresponding surface portions of the other member to impart relative lateral movement to the members to expand the body into engagement with the interior of the pipe upon relative longitudinal movement of the members, said members having central lateral openings therethrough positioned to be in registration when said surface portions are in contact and one of which openings is longitudinally elongated, and an operating element extending through said openings for engagement with the members in the openings to rotate the body.

4. An inside pipe wrench comprising two elongated body members shaped to be assembled in longitudinally movable sliding relation for insertion in a pipe, each of said members having surface portions which are inclined in opposite directions longitudinally of the member and positioned for sliding engagement with corresponding surface portions of the other member to impart relative lateral movement to the members to expand the body into engagement with the interior of the pipe upon relative longitudinal movement of the members, each of said members having a central externally thickened portion forming laterally extending shoulders thereon, said members having lateral openings through said thickened portions positioned to be in registration when said surface portions are in contact and one of which is longitudinally elongated, and an operating element extending through said openings for engagement with said members in the openings to rotate the body.

References Cited in the file of this patent

UNITED STATES PATENTS

| | | |
|---|---|---|
| 718,582 | Rancourt | Jan. 13, 1903 |
| 872,940 | Holmberg | Dec. 3, 1907 |
| 1,470,421 | Astley | Oct. 9, 1923 |
| 2,357,553 | Schwinn | Sept. 5, 1944 |
| 2,715,346 | Thomas | Aug. 16, 1955 |